United States Patent
Chu

(10) Patent No.: US 7,677,461 B2
(45) Date of Patent: Mar. 16, 2010

(54) DIGITAL LABELS FOR PRODUCT AUTHENTICATION

(75) Inventor: Victor Chu, New York, NY (US)

(73) Assignee: Mil. Digital Labeling Inc., New York, NY (US)

(*) Notice: Subject to any disclaimer, the term of this patent is extended or adjusted under 35 U.S.C. 154(b) by 58 days.

(21) Appl. No.: 11/470,380

(22) Filed: Sep. 6, 2006

(65) Prior Publication Data

US 2007/0051816 A1 Mar. 8, 2007

Related U.S. Application Data

(63) Continuation-in-part of application No. 11/371,530, filed on Mar. 9, 2006, now Pat. No. 7,392,953.

(60) Provisional application No. 60/660,500, filed on Mar. 10, 2005, provisional application No. 60/714,883, filed on Sep. 7, 2005, provisional application No. 60/716,559, filed on Sep. 13, 2005.

(51) Int. Cl.
*G06K 19/06* (2006.01)

(52) U.S. Cl. .................. 235/492; 235/487; 235/380; 235/375

(58) Field of Classification Search .............. 235/487, 235/492, 380, 375
See application file for complete search history.

(56) References Cited

U.S. PATENT DOCUMENTS

| | | | |
|---|---|---|---|
| 6,753,830 B2 * | 6/2004 | Gelbman | 345/55 |
| 2002/0005774 A1 * | 1/2002 | Rudolph et al. | 340/5.61 |
| 2006/0265744 A1 * | 11/2006 | Jung et al. | 726/21 |
| 2007/0024551 A1 * | 2/2007 | Gelbman | 345/85 |

* cited by examiner

*Primary Examiner*—Karl D. Frech
(74) *Attorney, Agent, or Firm*—Coats & Bennett, P.L.L.C.

(57) ABSTRACT

A label for a product includes an electronic display for displaying label information. The digital label includes a processor, a memory, and a display configured to store and display label information about a product to which the label is attached. The digital label also stores product authentication data for authenticating the product to which the label is attached.

18 Claims, 22 Drawing Sheets

C

10

B

A

10

DIGITAL LABELS FOR PRODUCT AUTHENTICATION

RELATED APPLICATIONS

This application is a continuation in part of U.S. patent application Ser. No. 11/371,530 filed Mar. 9, 2006 now U.S. Pat. No. 7,392,953 entitled "Programmable Digital Labels," which claims benefit of Provisional Application Ser. No. 60/660,500 filed on Mar. 10, 2005 entitled "Transmittable Digital Product and Label Data." This application also claims benefit of U.S. Provisional Application Ser. No. 60/714,883 filed Sep. 7, 2005 entitled "Digital Authentication Labeling Device," and U.S. Provisional Application Ser. No. 60/716,559 filed Sep. 13, 2005 entitled "Techniques To Attach A Digital Label To Goods." U.S. patent application Ser. No. 11/371,530 and U.S. Provisional Patent Application Nos. 60/714,883 and 60/716,559 are incorporated herein by reference.

BACKGROUND OF THE INVENTION

The present invention relates generally to the field of digital labels and tags for products. It is typical for the manufacturer of a product to affix a label to the product which bears the manufacturer's brand name or logo. Labels are also used to provide product information and information about the manufacturer of the product. Because labels are typically small, they can carry only a limited amount of information. Therefore, it is not at all uncommon to find two or more labels affixed to different locations of a single product. For example, a product may carry a brand label which is placed in a visible location, and interior labels to give product information. However, there is a small, finite limit to the number of labels which can be applied to a product without cluttering the product.

In the past, labels have served as merely static and passive devices to convey label information that is fixed in time, and have not been used to expand the functionality of the product. Animated designs and logos are not possible with conventional woven, printed or stamped labels. Also, conventional labels cannot display information which may change over time, or user-specific information.

Another drawback of conventional labels is how easily conventional labels can be duplicated by counterfeiters. The primary function of a label is to identify the source of the goods to which the label is attached. Duplication of labels by counterfeiters thus undermines the essential purpose of the label and results in fraud on consumers.

SUMMARY OF THE INVENTION

The present invention is a digital label for products that can be programmed to store, process, transmit and display information including label information and user-specific information. The digital label can also store authentication data to authenticate the product. The digital label can be attached to products using a variety of methods.

DETAILED DESCRIPTION OF THE DRAWINGS

Figure 1:
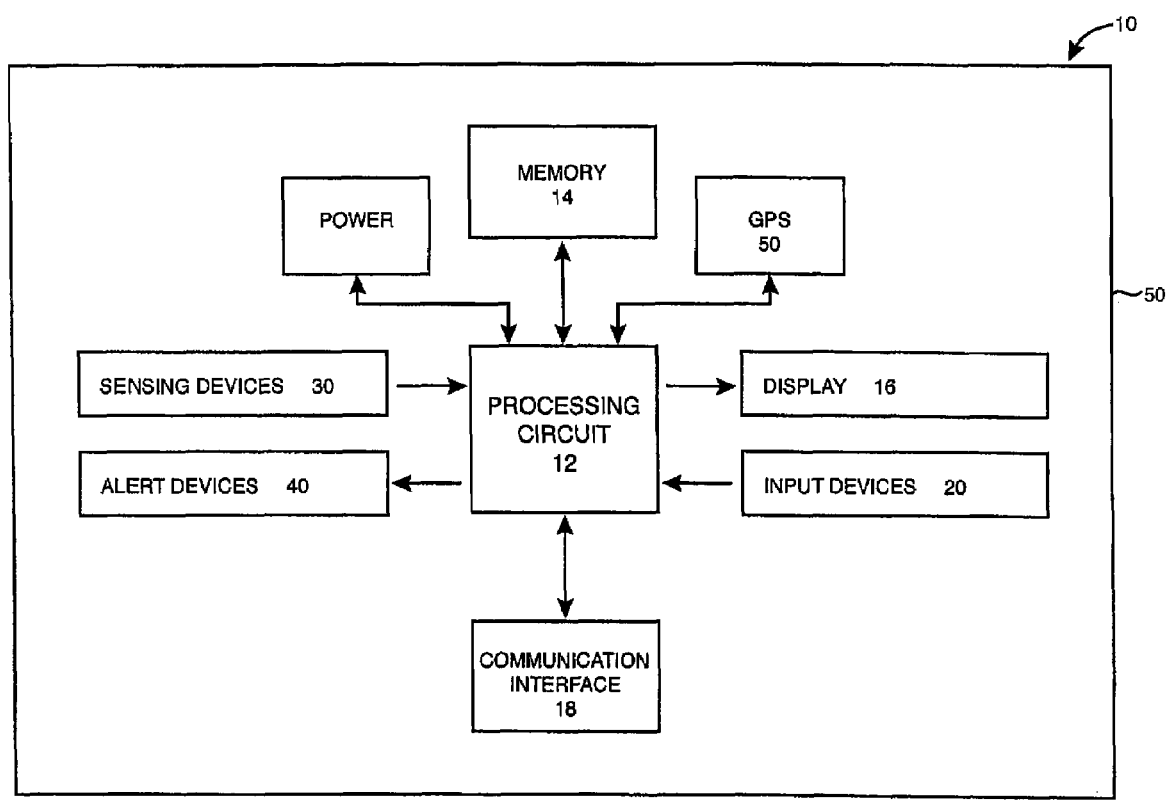
FIG. 1 is a functional block diagram of an exemplary digital label.

Referring now to the drawings, and particularly to FIG. 1, a digital label 10 for products is shown and indicated generally by the numeral 10. For purposes of this application, the term "digital label" means a device having a display that functions principally as a means of identification that is attached or affixed to a product to designate its origin, owner, manufacturer, contents or ingredients, use, etc. The term "label" is used in the common sense to mean a device that is distinguishable from the product to which it is affixed and not a usual or inherent feature of the product necessary for its functioning. For example, a computer monitor and a display for a consumer electronic device (e.g., watch, cell phone, camera, etc.) are not considered to be "labels" as that term is used herein because the displays are inherent product features.

The digital label 10 stores and displays label information and other information as more fully described below. The term "label information" includes source information indicating the source or origin of the product, product information describing the features contents, ingredients or use of the product, and manufacturer information that provides information about the product manufacturer. An example of source information is a brand name, logo (including animated logos), or slogan which identifies the source or origin, and authentication data for verifying the authenticity of the product. In contrast to conventional static labels, an animated trademark or logo may be created by displaying a sequence of images. In one exemplary embodiment, the images are displayed in half second intervals in cyclical fashion. Examples of product information are instructions for the care or use of the product, and description of the contents or ingredients of the product. Examples of manufacturer information are the address (including an e-mail address) or telephone number for contacting the manufacturer, and the IP address of a web page for finding additional information about the company and its products.

The digital label 10 may also store consumer information or user information in addition to label information, and perform custom functions for the user. Consumer information is personal user information that affects the ownership, history, usage and effectiveness of the product. Examples of personal information are registration data, such as the name, address, contact information, weight, height, age, birth date, sex, DNA, allergies, medical and health conditions and history, scheduling information, personal preferences, diet, account information, other product usage data, etc.

The digital label 10 is particularly useful for products that do not otherwise include a display or microprocessor as an inherent feature of the product, but may also be used on products with a display or microprocessor. For example, in products that include a display as a functional feature of the product, the manufacturer may still use the digital label 10 of the present invention to provide a separate, dedicated display or microprocessor for displaying and transmitting trademarks, logos, brands, slogans, or other label and product information.

Figure 2:
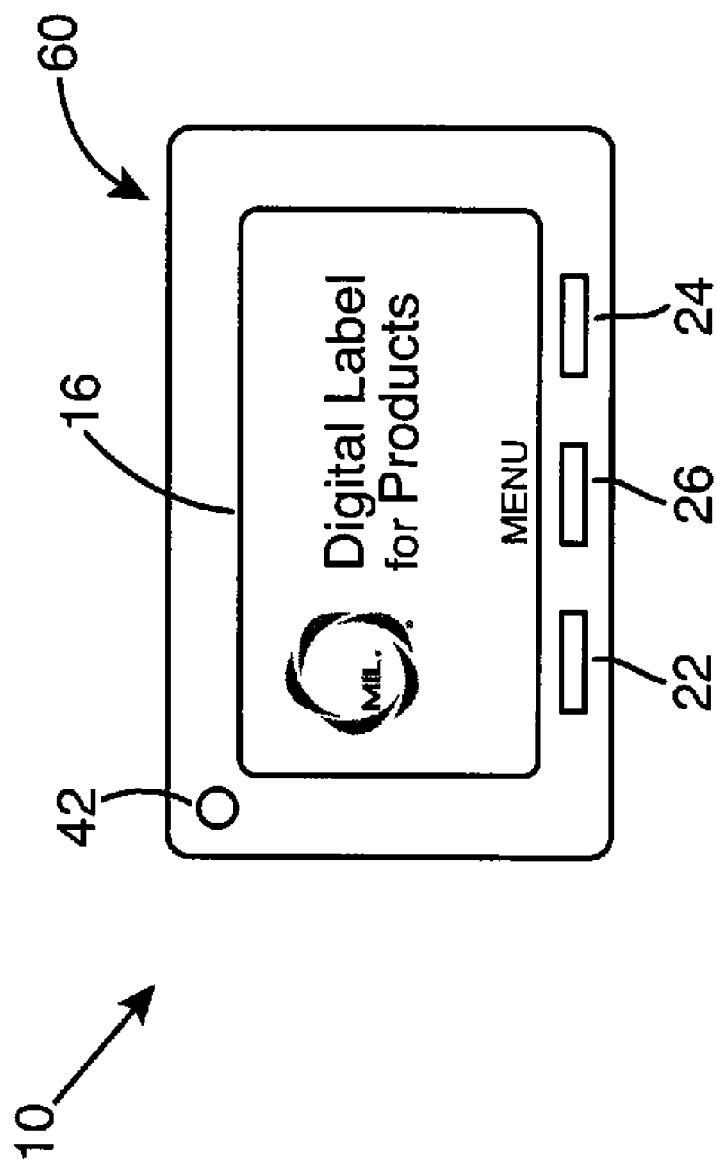
FIG. 2 is a front view of an exemplary digital label.

FIGS. 1 and 2 illustrate the main components of the digital label 10 according to one exemplary embodiment. The digital label 10 comprises a processing circuit 12, memory 14, display 16, a communications interface 18, and a battery 19 to provide power for the digital label 10. The processing circuit 12 controls the overall operation of the digital label 10 according to program instructions stored in memory 14 and may comprises one or more digital processing devices, such as microprocessors, microcontrollers, hardware, firmware, or a combination thereof. Memory 14 stores program instructions and data needed for operation. The display 16 may comprise a liquid crystal display (LCD) or an organic light emitting diode (OLED). Additionally, the display 16 may use printed or textile electronic displays, electronic paper displays, or electronic ink technology provide a thin, flexible and durable display to enable users to view information. The communications interface 18 may comprise a short-range wireless interface, such as a BLUETOOTH interface, ZIGBEE, or WIFI interface, a long range cellular phone or satellite communications interface, or a wired interface, such as a RS 232, USB or FIREWARE interface. There may be more than one communications interface 18.

Some embodiments of the digital label 10 may additionally include one or more user input devices indicated generally by the numeral 20. User input devices 20 for the digital label 10 may comprise any known input device including buttons, keypads, touch pads, wheels, dials, mouse devices, trackballs, etc. A touch screen display could also be used for user input. Imaging systems and motion or movement systems for recognizing hand gestures, and voice recognition systems may also be used for receiving user input. In FIG. 2, three soft keys denoted by the numerals 22, 24, 26 are provided to receive user input. The soft keys 22, 24, 26 may have different functions depending on the current context. The function of the soft keys 22, 24, 26 may be displayed to the user on display 16 when the soft keys 22, 24, 26 are active. For example, the middle key 26 shown in FIG. 2 has the text MENU displayed above the key 26 on the display 16. Pressing the soft key 26 in this context will invoke an onscreen menu. In some embodiments, more sophisticated user input devices can be used to enable users to input user information.

The digital label 10 may receive input from one or more sensors or detectors 30 that sense environmental conditions such as temperature, pressure and humidity; or product characteristics, such as size, volume, weight of the product, or chemical changes in the product. In some embodiments, sensors 30 may be used to detect materials, parts, or components of authentic products. If the product to which the label 10 is attached does not meet product specifications for a genuine product, a warning can be generated and displayed to the user. Sensors or detectors 30 may also be used to detect product usage and/or tampering. Sensors or detectors 30 for the digital label 10 may also detect location, distance or proximity. The digital label 10 may incorporate a GPS receiver 50 or other location detector to determine location and history of locations. Clocks and counters may provide additional input to the processing circuit 12. Those skilled in the art will appreciate, however, that the processing circuit 12 may include internal clocks and counters.

Biometric sensors may be provided on the digital label 10 for protection of sensitive information, such as authentication data and/or user information. The biometric sensors, in conjunction with the operating system, limits access to sensitive information that is stored in memory 14. Biometric sensors can also be used to limit access to certain functions or features of the digital label 10.

The digital label 10 may include or control one or more alerting devices 40 for alerting the user of specified events or conditions. The alerting devices 40 may comprise indicator lights that illuminate or generate lighting effects; speakers, beepers, buzzers, or other sound devices; and vibrators or other tactile devices. The digital label 10 could also play MP3 or other audio files to alert the user. The alerting devices 40 are controlled by the system processor to notify the user when predetermined events or conditions occur. The alerts can be personalized and customized by the user to distinguish the alerts. FIG. 2 illustrates an indicator lamp 42 that is used as an alerting device 40.

Figure 3:
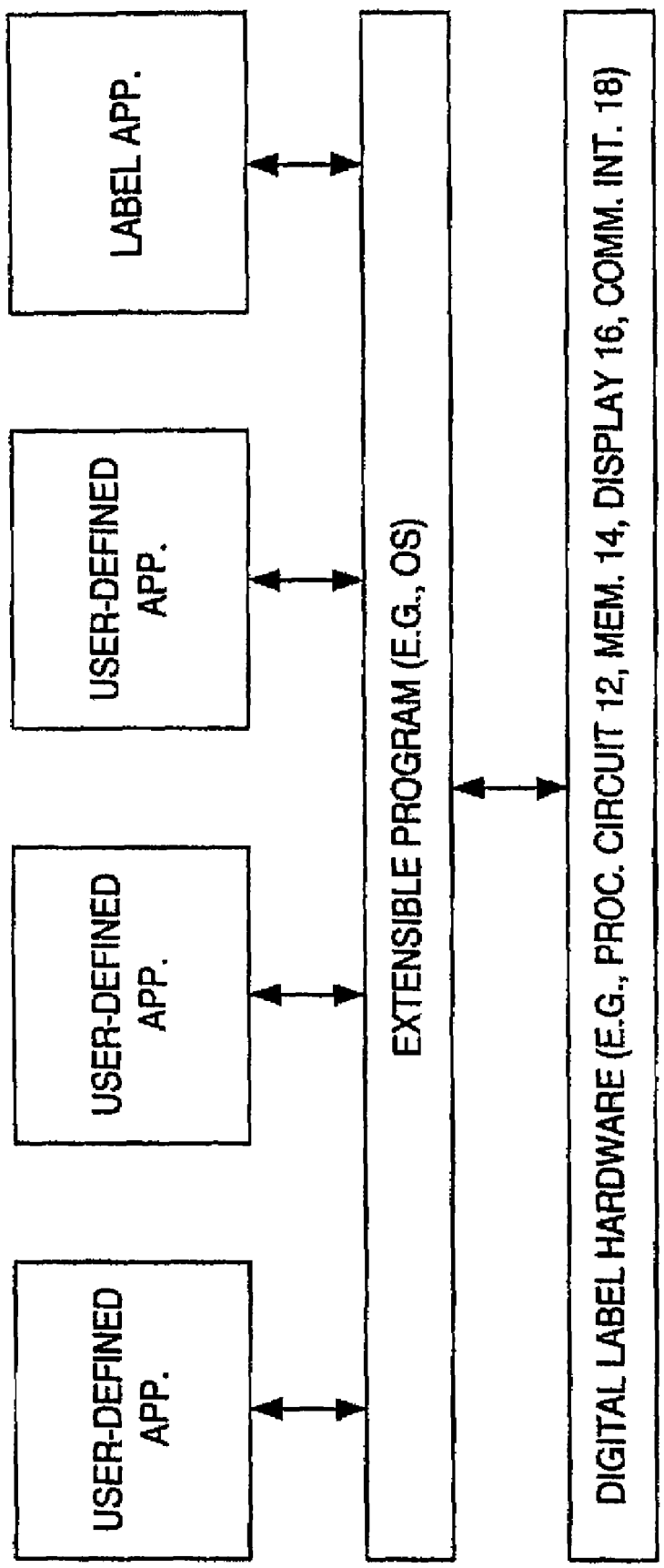
FIG. 3 illustrates an exemplary software architecture for the digital label.

FIG. 3 illustrates the relationship of the extensible program with other elements of the digital label 10. The extensible program may comprise, for example, an operating system program with an application interface (API) to enable manufacturers, retailers, and end users to develop custom applications for the digital label 10. The operating system may, for example, be an embedded operating system such as Windows CE, Symbian, QNX, or embedded Linux. A proprietary operating system could also be used. A label application for managing and displaying label information can be preloaded and stored in the memory 104 of the digital label 10 by the label manufacturer. Additional user-defined application programs can be input and stored to add additional functions to the digital label 10 by the product manufacturer, by retailers of the products, or by end users of the products. The custom application programs can be input via one of the communication interfaces 18. The operating system or other extensible program is able to execute the custom applications developed by the product manufacturer, retailer, or end user. The type of functions that can be performed by custom applications is virtually unlimited. For example, the application programs can perform functions such as product authentication, location tracking, scheduling, usage tracking, etc.

Figure 4:
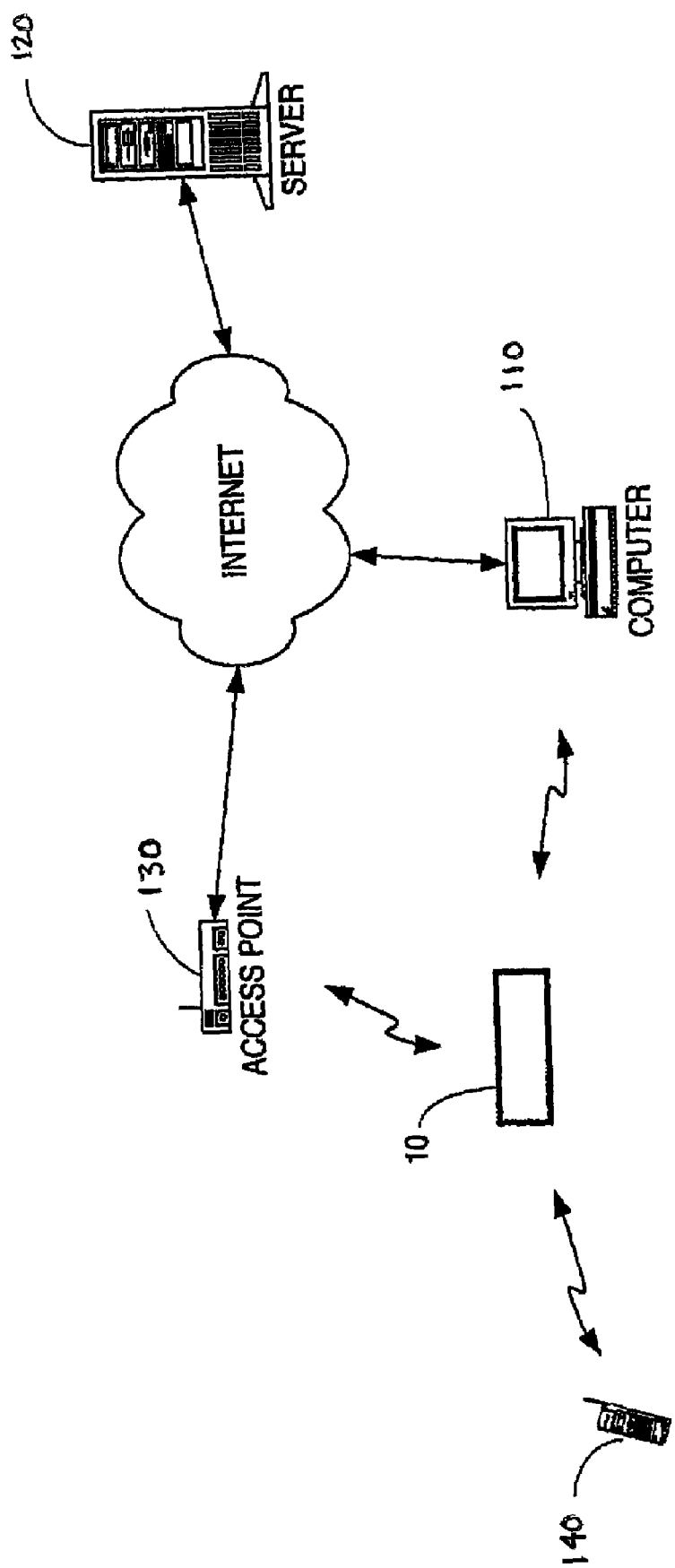
FIG. 4 illustrates the digital label communicating with other devices in a network environment.

One advantage of the digital label 10 is its ability to communicate and share information with other devices. The digital label 10 may have its own IP address assigned so that it can communicate directly with other devices across the Internet. FIG. 4 illustrates different ways the digital label 10 can communicate with other devices. FIG. 4 illustrates a local computer 110, a web-based server system 120, and a cell phone or PDA 140. The digital label 10 communicates with the local computer 110 over a local area network. The digital label 10 may communicate with a web-based server system 120 by connecting to a web access point 130. The server system 120 may, for example, comprise an authentication server maintained by the product manufacturer for authenticating labeled products as hereinafter described. The digital label 10 may also communicate with the cell phone or PDA 140, using a standard cellular or satellite transceiver.

The digital label 10 may store, process and communicate user information. The user information may be entered directly by the user or may be transferred over the communications interface 18 to the digital label 10. For example, the digital label 10 may collect information about the use of the product and store the information for subsequent viewing and analysis. The digital label 10 may generate history reports that can be viewed by the user on the display 16 or transferred to other devices. Also, label information stored in the digital label 10 at the time of purchase by the customer can be updated via the communications interface 18.

The variety of applications that can be developed for the digital label is virtually limitless. A few exemplary applications are described in co-pending U.S. patent application Ser. No. 11/371,530 filed Mar. 9, 2006 entitled "Programmable Digital Labels." This application is incorporated herein by reference.

A recurring problem with branded and successful goods, such as designer and luxury clothing, handbags, accessories, jewelry, luggage, medication, liquor, and replacement parts, is the prevalence of counterfeit goods. As noted above, the digital label 10 of the present invention may store authentication data that enables purchasers of such goods to verify the authenticity of the products they purchase. The authentication data may comprise, for example, a serial number or code that can be used by the purchaser to authenticate genuine products. In some exemplary embodiments, the authentication data may be encrypted with a secret code to prevent counterfeiters from duplicating digital labels 10. The authentication data may also change over time to make it more difficult to mimic. Access to authentication data can be limited by password protection or by biometric sensors.

Figure 5:
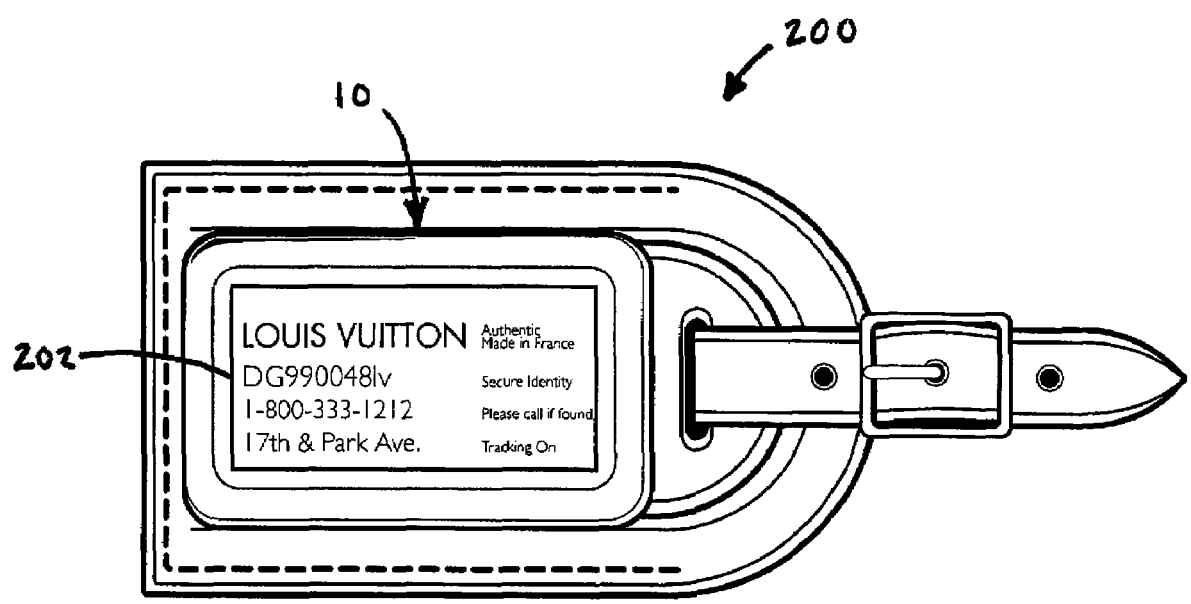
FIG. 5 illustrates a tag for products incorporating a digital label.

FIG. 5 illustrates a tag 200 including a digital label 10 for products such and luggage, handbags, and brief cases. The digital label 10 stores an serial number 202 in memory 14 to enable users to authenticate genuine goods. In this embodiment, the serial number 202 functions as authentication data for authenticating the product to which the tag 200 is attached. The memory 14 for storing the serial number 202 may be a secure, tamper-proof memory to prevent tampering. The serial number 202 may also be encrypted by the manufacturer with a secret key. For example, the serial number 202 may be encrypted or signed with the manufacturer's private key and can be verified by the user by decrypting the serial number 202 using the manufacturer's corresponding public key, which can be obtained from the manufacturer's web site. If the serial number 202 is successfully decrypted, the user can be confident that the product is a genuine product so long as the manufacturer's private key has not been compromised. The user can also verify the authenticity of the product by sending the serial number 202 to the manufacturer during product registration for verification. The serial number 202 could be read by the user from the digital label 10, or could be transmitted from the digital label 10 to the user's computer or other device. In some embodiments, the digital label 10 could transmit the serial number 202 via the Internet to a server maintained by the manufacturer for verification.

Figure 10:
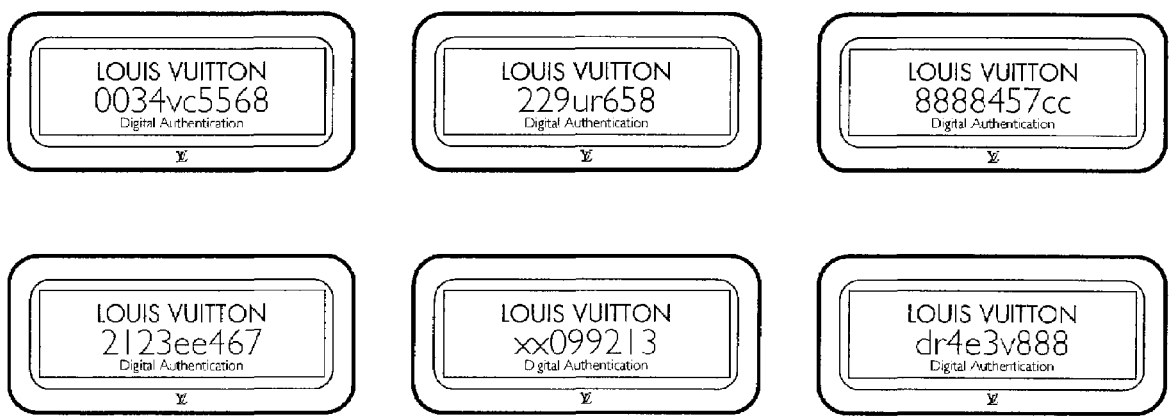
FIG. 10 illustrates an exemplary sequence of changing authentication codes.

Referring to FIG. 10, the digital label 10 can be programmed to change or update the serial number 202 at a predetermined interval to make it more difficult to mimic. The digital label 10 may include an algorithm for generating the serial number 202 that is known only to the product manufacturer. For example, the algorithm may comprises a function that generates a serial number 202 based on the current time and a secret key that is stored in a secure, tamper-proof memory. The serial number 202 will then appear to be a random number that continuously changes, but which can be easily verified by the manufacturer based on the current time. The random number stored in each label 10 can be stored by an authentication server.

In some embodiments, an algorithm that generates a predetermined set of serial numbers can be stored in each label 10. The possible set of serial numbers based on the algorithm can be pre-computed and stored in memory by the authentication server. When a serial number is provided for verification, the computer can compare the serial number provided to each stored serial number to determine if there is a match. This approach avoids the need to provide the current time when verifying a product.

Those skilled in the art should appreciate that while serial numbers can function as authentication data, separate authentication data can also be used. For example, the manufacturer may assign both a serial number for product registration and a separate authentication number for product verification.

Figure 24:
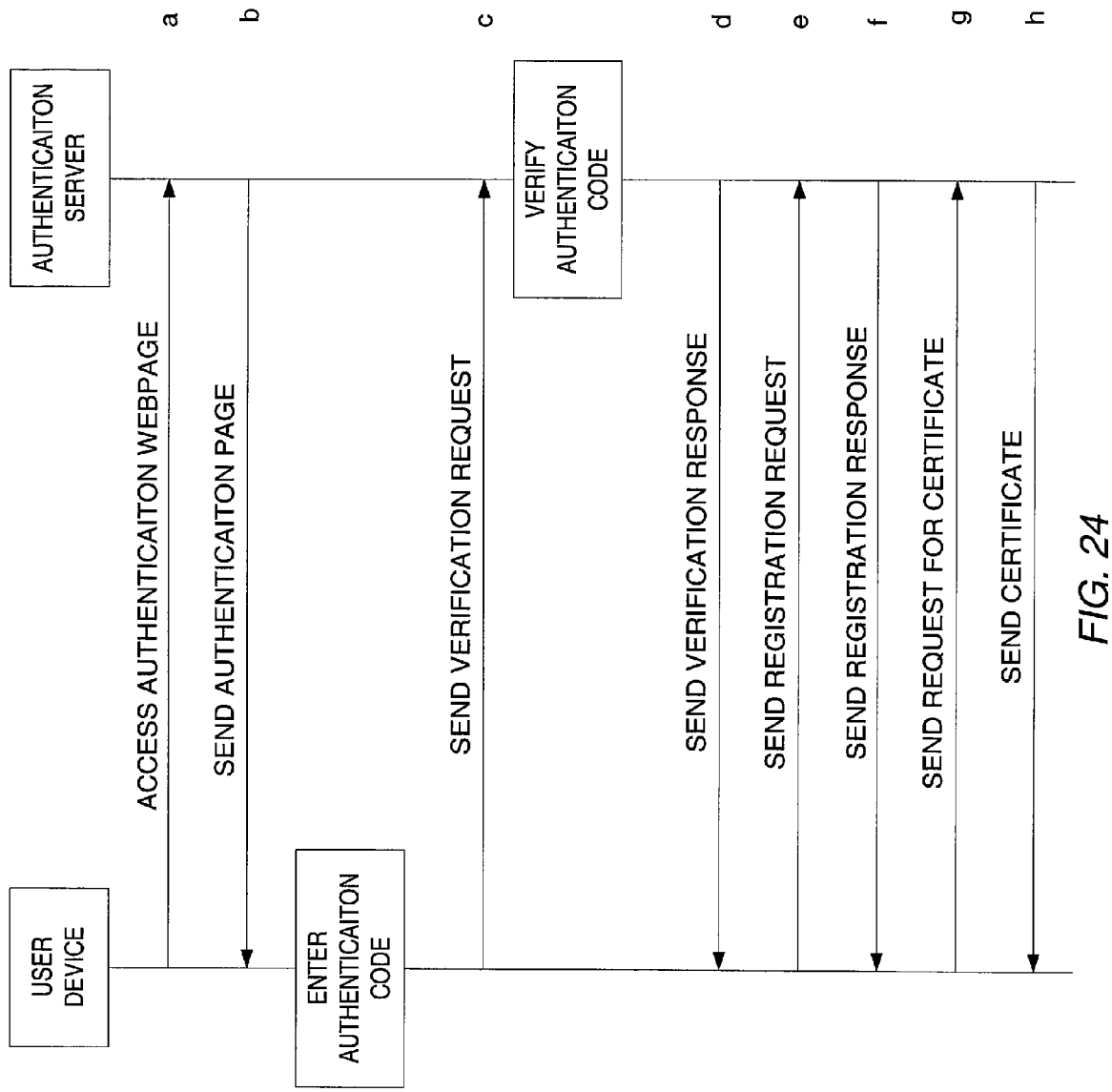
FIG. 24 illustrates an exemplary Internet-based authentication procedure for authenticating a labeled product.
Figure 25A:
FIGS. 25A and 25B illustrate an exemplary user interface for an Internet-based authentication system.
Figure 25B:
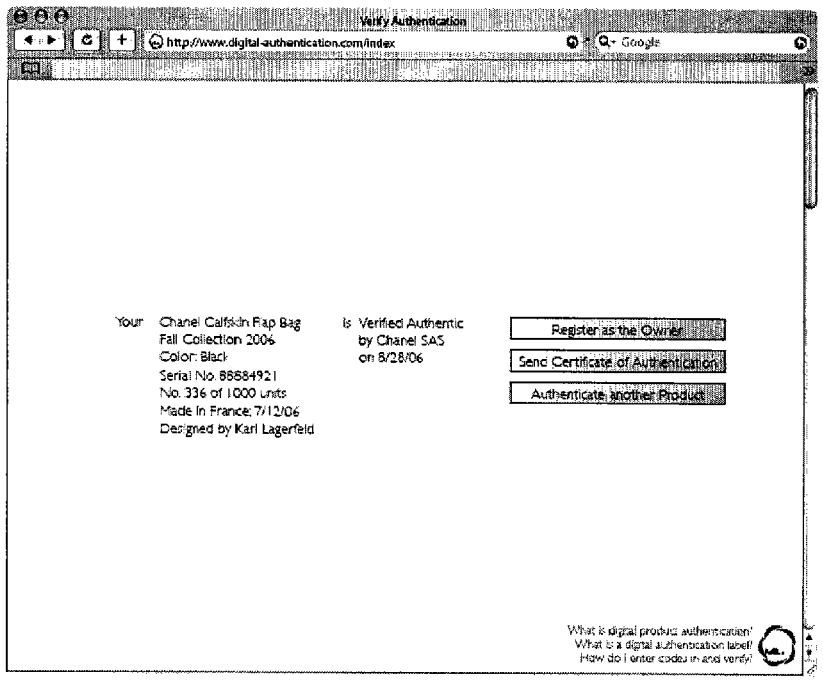

FIG. 24 illustrates an exemplary Internet-based process for authenticating products identified by the digital label 10. An authentication server is accessed over the Internet in a conventional fashion and a verification page with a verification form is displayed to the user on a user device (step a & b). The user device can be any device with Internet access, including a local computer, personal digital assistant device, or cellular telephone. An exemplary authentication form for display of a user device is shown in FIG. 25A. The serial number 202 displayed on the product label 100 is entered into the authentication form (FIG. 25A). When the user clicks on the VERIFY button, the serial number 202 is transmitted to the authentication server (step c). The authentication server validates the serial number 202 provided by the user and returns a validation response (step d). FIG. 25B illustrates a validation response where the authentication of the product is successful. The validation response provides a number of options to the user. In this example, the user is given the options of registering as the owner of the product, requesting a certificate of authenticity, and authenticating another product.

If the user elects to register as the owner, the process continues with the user sending a registration request including necessary registration information to the authentication server (step e). The authentication server will then send a registration response indicating whether the registration was successful (step f). In some embodiments, user information may be provided with a verification request and registration may be performed automatically without further user input if the product verification is successful.

If the user requests an authentication certificate (step g), the authentication server sends an electronic certificate, which may be encrypted with the manufacturer's private signature key. The electronic signature ensures that authentication certificates cannot be easily counterfeited. The authentication certificate is useful in the event the purchaser resells the product. When purchasing allegedly authenticate designer goods secondhand, the purchaser can request a copy of the authentication certificate and verify for theirself that the goods are authentic.

Figure 26:
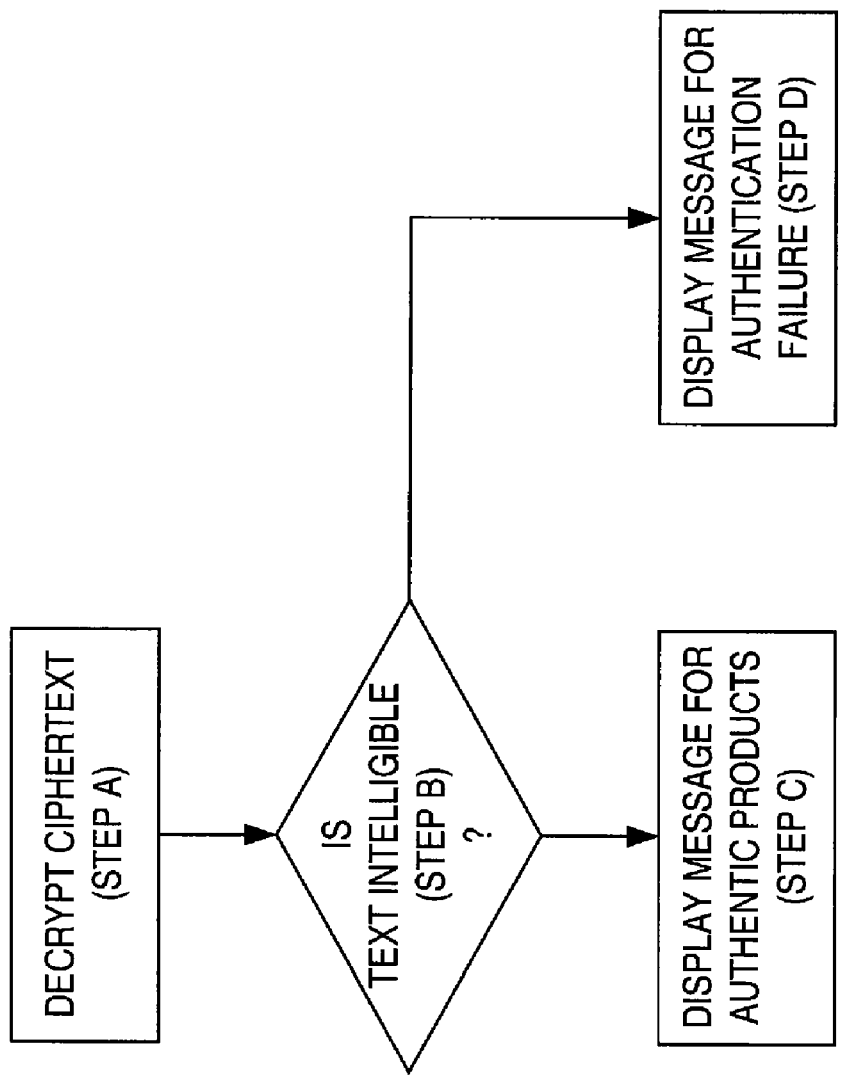
FIG. 26 illustrates another exemplary method for authenticating a labeled product.

FIG. 26 illustrates another exemplary method of verifying the authenticity of a product. This method does not require the involvement of an authentication server. In this example, the authentication data comprises a predetermined word or message that is encrypted with the manufacturer's private key. For example, the message may read "YOUR CHANEL HANDBAG HAS BEEN VERIFIED AUTHENTIC. YOUR SERIAL NUMBER IS 972402." The encrypted text is decrypted using the manufacturer's public key (step a). If the decrypted messages is intelligible (step b), the decrypted text is displayed (step c). If the decrypted message is unintelligible, the product is not authentic and a message indicating authentication failure is displayed (step d).

The tag 200 or digital label 10 may further include a GPS receiver 50 to enable tracking of the product. The GPS receiver 50 in the digital label 10 can determine and record the product's location periodically. This feature can be activated, for example, when the user is traveling to keep a history of the product's movement. The product manufacturer may maintain the web-based server to track products for its registered customers. An application program in the digital label 10 can report the current position of the product to the server at predetermined time intervals or in response to predetermined events or conditions. FIG. 8 illustrates an interface for a web-based tracking system that can be accessed by the user via the Internet to track the product.

Figure 6:
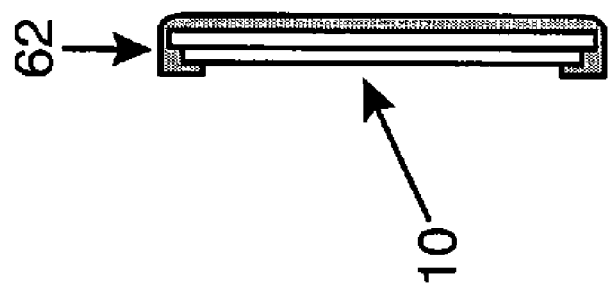
FIG. 6 is a side view of an exemplary secondary encasement, which is shown in section.

The digital label 10 may include a primary casing 60 to house the components of the digital label 10. The primary casing 60 is preferably waterproof or water-resistant to protect the components. The primary casing 60 should also be impact resistant and shock-resistant. The casing 60 may be constructed of plastic, rubber, metal, ceramic, or other materials or organic, environmentally friendly protein based material that is easily recycled or returned to the earth. In some embodiments, the digital label 10 can be integrated with a product or product container or product packaging. In still other embodiments, a secondary encasement 62 as shown in FIG. 6 can also be used that allows the digital label 10 to be removed from the product. The secondary encasement allows the user to take the digital label 10 with them to interact, monitor and control the product remotely.

Any suitable method of attaching the digital label 10 or the secondary encasement 62 to the product may also be used. For example, the digital label 10 or secondary encasement 62 may be secured to products by adhesives, by magnets, by sewing or stitching, by sonic welding laser welding or heat welding, by VELCRO-type fasteners, or by mechanical fasteners such as hooks, screws, buckles, zippers, snaps, or pins. The digital label 10 could also be entrapped or retained by other features of the product which function as the secondary encasement 62. For example, the label 10 could be designed as a cartridge which slides in a pocket or pouch on the product. The digital label 10 could also be designed to snap into the product and be released by a mechanism. The digital label 10 may also be suspended from or secured to the product by means of a hanger, strap or cord that passes though an opening (not shown) in the casing 60 or secondary encasement 62.

A digital label 10 can also be attached to the product as a hangtag or separate authentication device. This application is useful for products that are smaller than the digital label 10 and where functional, aesthetic, size, shape, form and design considerations dictate that the digital product authentication label not be applied directly to the product. Examples of products where a digital label 10 can be attached by a hangtag include watches, jewelry, sunglasses, optical wear, wallets, articles of clothing and accessories, artwork, music, video, intellectual property, soft goods, and hard goods. This type of attachment technique for digital product authentication labeling offers versatility and the ability to authenticate any original product or intellectual property regardless of integration and direct application issues due to function, aesthetics, size, shape, form or design.

Figure 7A:
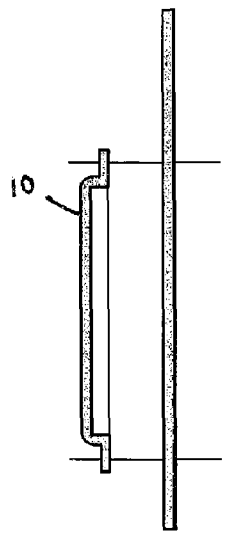
FIGS. 7A-7F illustrate methods of surface mounting the digital label to various goods.
Figure 7B:
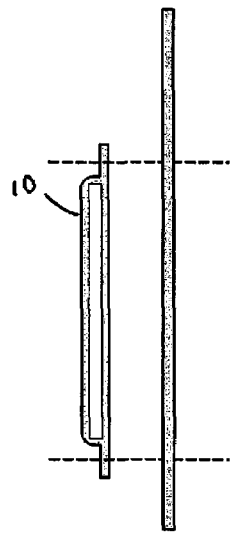
Figure 7C:
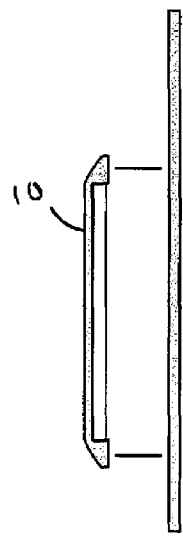
Figure 7D:
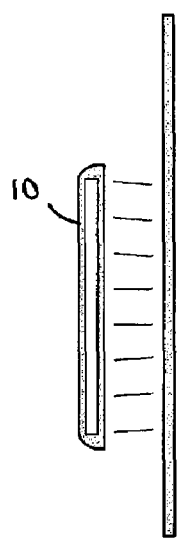
Figure 7E:
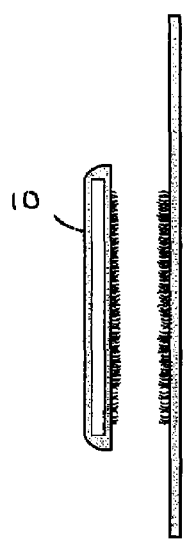
Figure 7F:
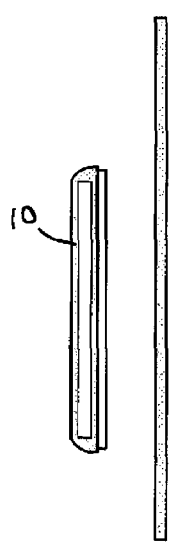

FIGS. 7A-7F illustrate various methods of attaching the digital label to products. FIG. 7A illustrates a digital label attached to a product by laser welding. FIG. 7B illustrates a digital label 10 attached to a product by stitching. FIG. 7C illustrates a digital label 10 attached to a product by sonic welding. FIG. 7D illustrates a digital label 10 attached to a product by a magnetic strip. FIG. 7E illustrates a digital label 10 attached to a product by a hook and loop type fastener. FIG. 7F illustrates a digital label 10 attached to a product by an adhesive.

Figure 8D:
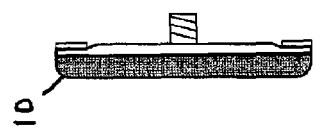
FIGS. 8A-8D illustrate various methods of mechanically attaching the digital label to a product.
Figure 8C:
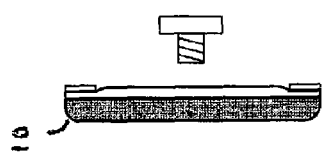
Figure 8B:
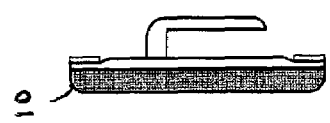
Figure 8A:
Figure 8A:
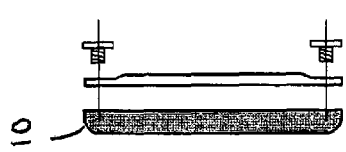

FIGS. 8A-8D illustrate various mechanical attachments for attaching the digital label 10 to products. In these embodiments, the digital label includes a back plate adapted for a specific form of mechanical attachment. FIG. 8A illustrates a back plate used as a clamp to fasten the digital label 10 to a product. FIG. 8B illustrates a hook member integrally formed with the back plate. FIGS. 8C and 8D illustrate screw fasteners for attaching the digital label to a product.

Figure 9B:
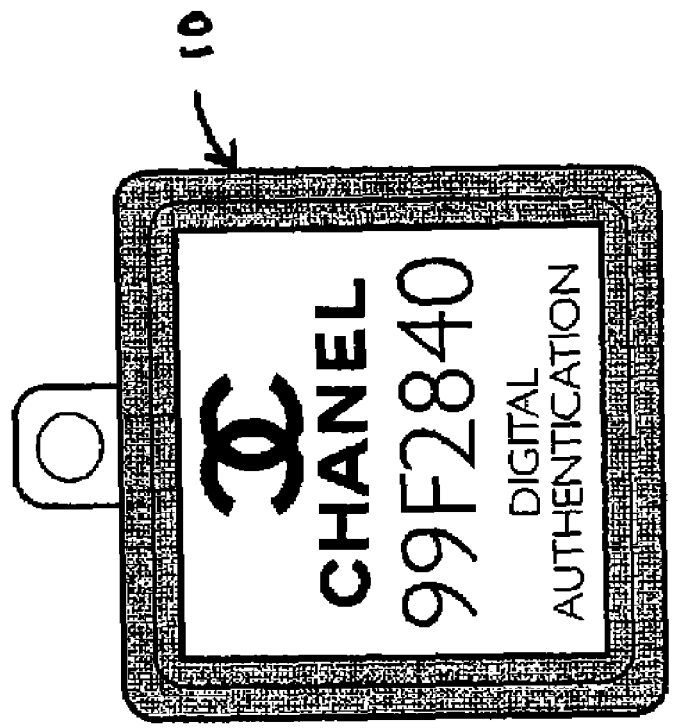
FIGS. 9A and 9B illustrate a digital label with a hanger for hanging the digital label from a product.
Figure 9A:
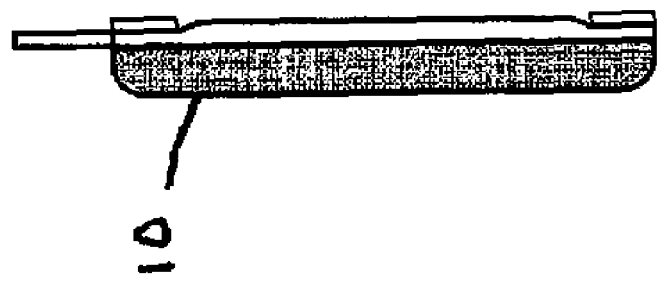

FIGS. 9A and 9B illustrate a digital label with a hanger for suspending or hanging the digital label. The hanger in this embodiment comprises a tab with an opening therein through which a strap or cord may pass.

Figure 11:
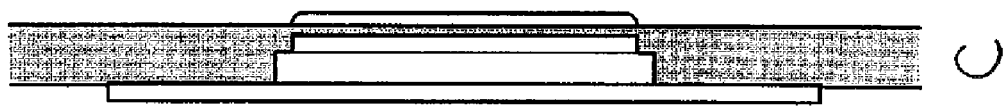
FIG. 11 illustrates a digital label embedded in a product.
Figure 11:
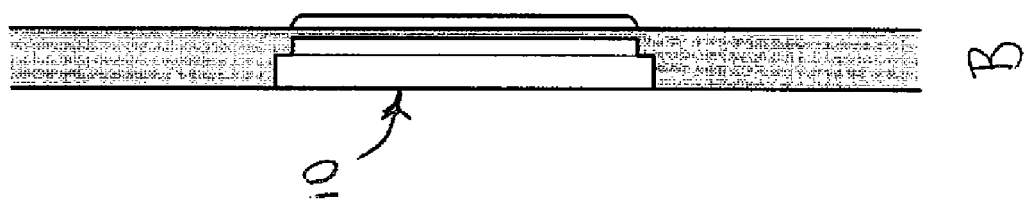
Figure 11:
Figure 11:
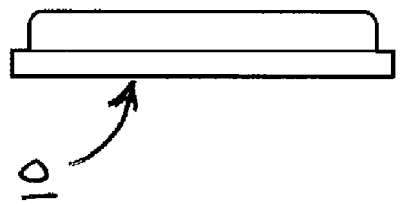

FIG. 11 illustrates a method of embedding a digital label 10 in a product. A pocket is formed in the product to receive the digital label 10. FIG. 11A is an exploded view showing the digital label 10 before it is inserted into the pocket. FIG. 11B shows the digital label 10 after it is inserted. Note that the digital label 10 projects through an opening on the front of the product. FIG. 11C shows a backing applied to the back surface of the product to retain the digital label 10.

Figure 12:
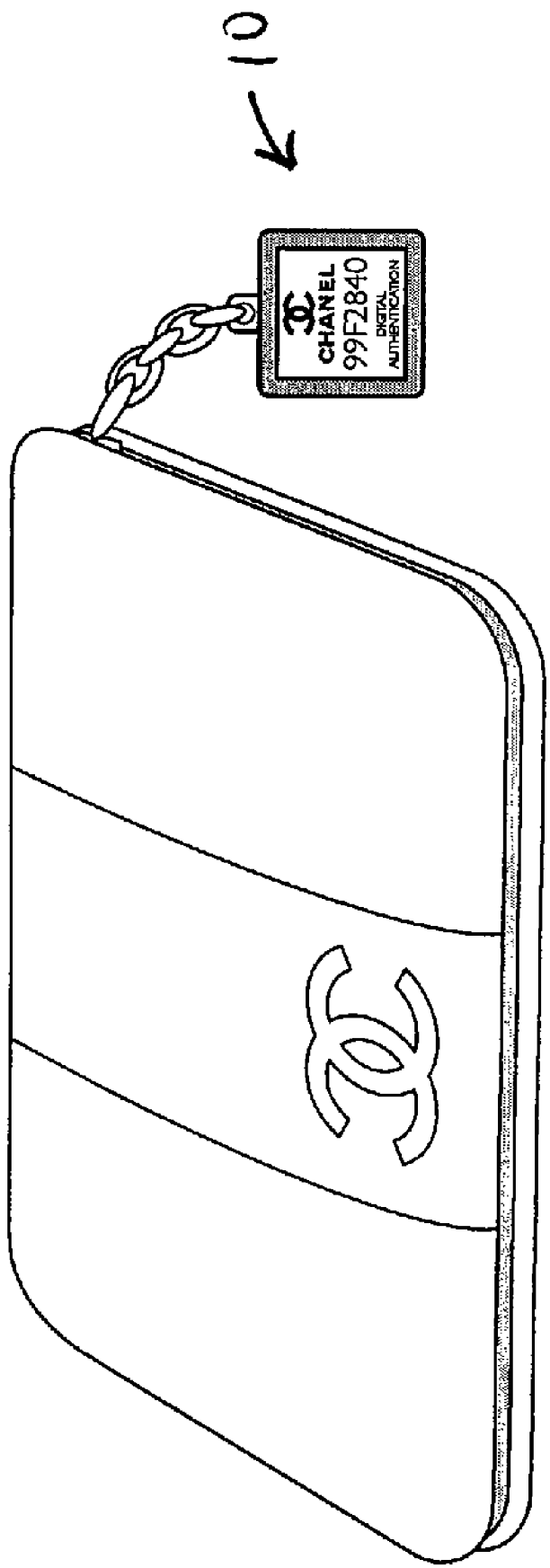
FIG. 12 illustrates a digital labeled 10 attached to a zipper pull of a wallet by a chain.
Figure 13:
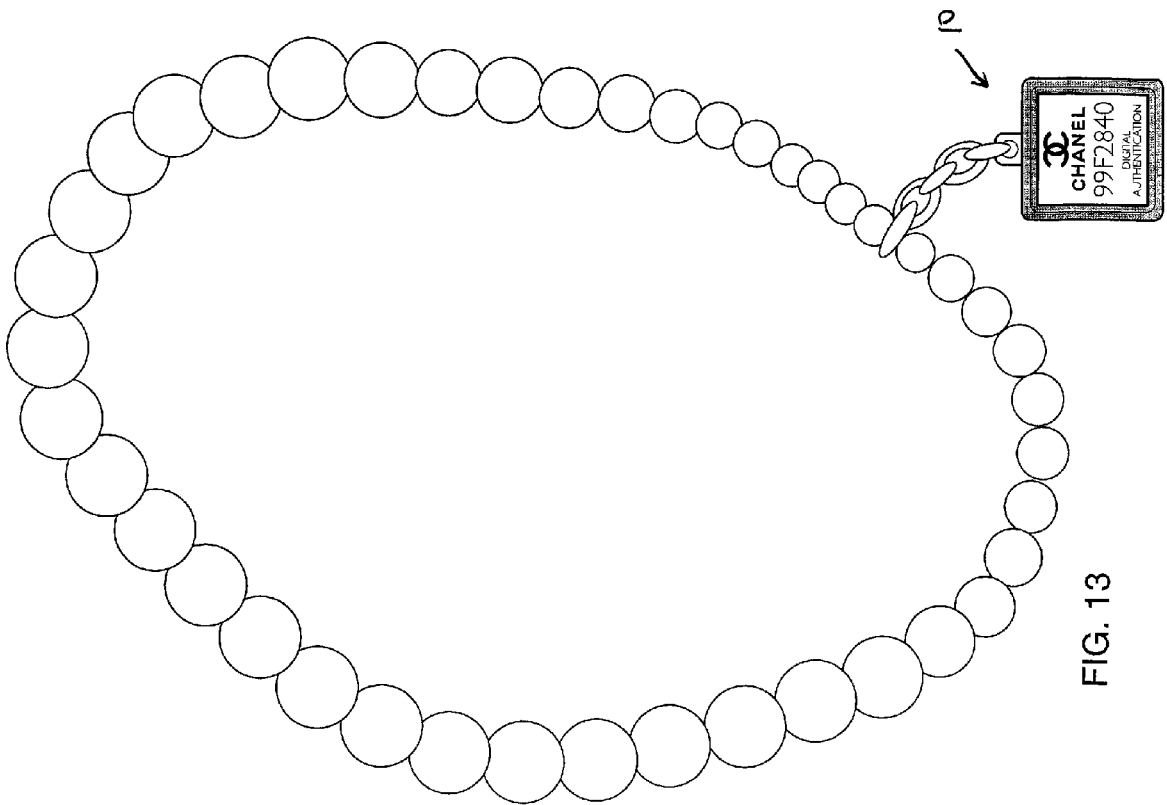
FIG. 13 illustrates a digital label 10 attached to a necklace by a chain.
Figure 14:
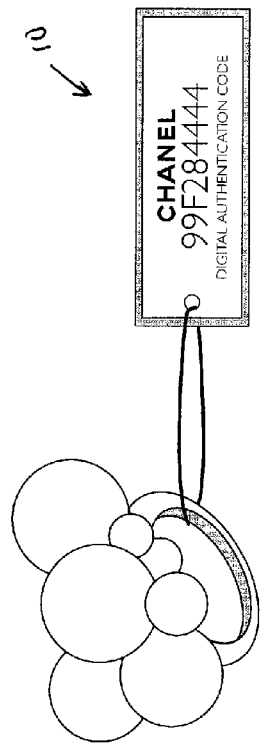
FIG. 14 illustrates a digital label 10 attached to a ring by a loop that passes through an opening in the digital label 10.
Figure 15:
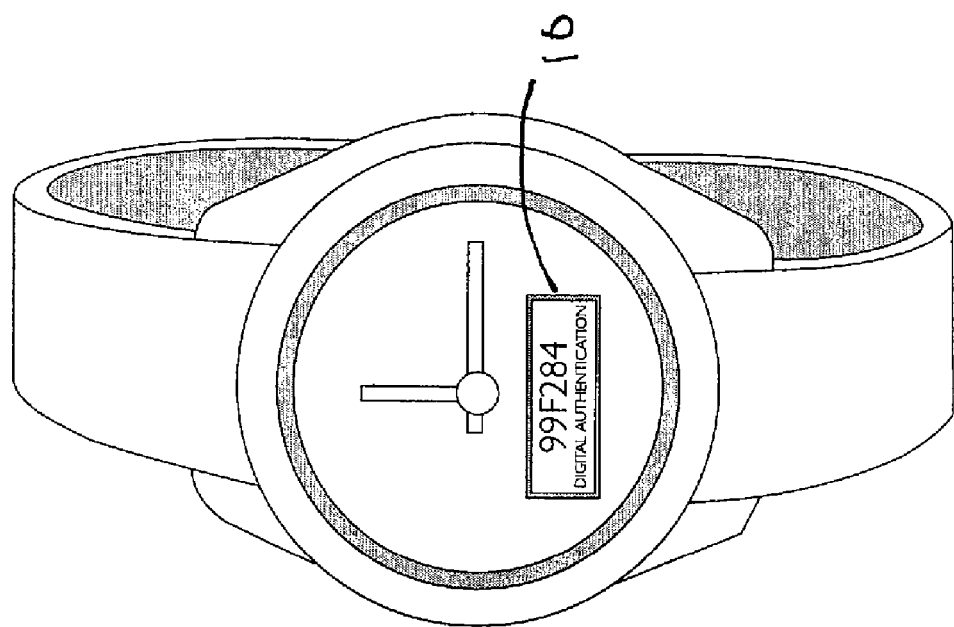
FIG. 15 illustrates a digital label 10 applied to the face of a watch.
Figure 16:
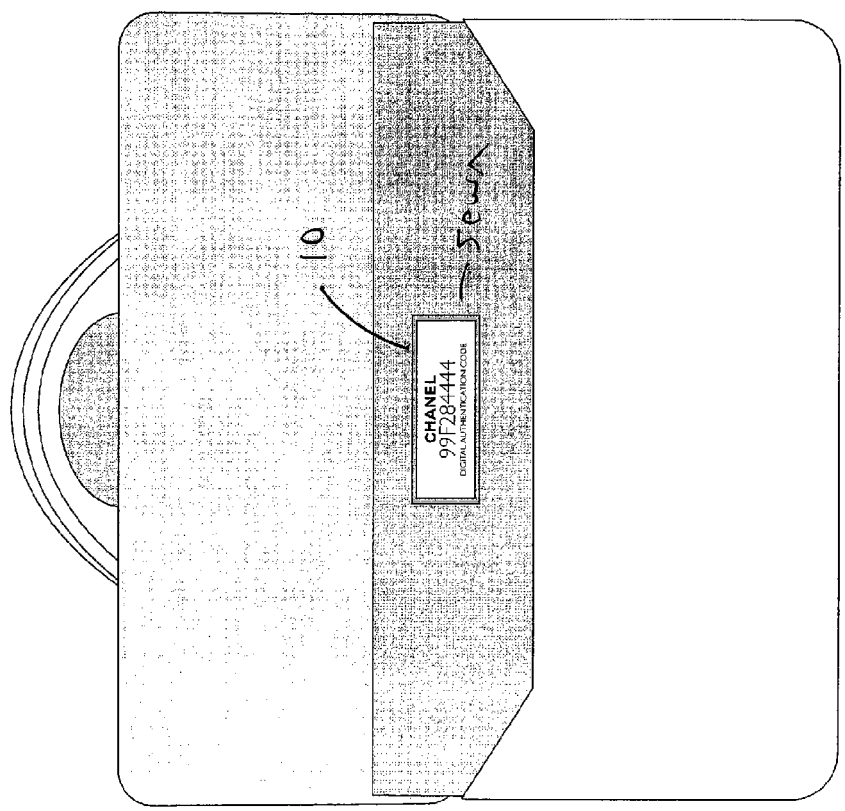
FIG. 16 illustrates a digital label 10 sewn to the lining of a handbag.
Figure 16:
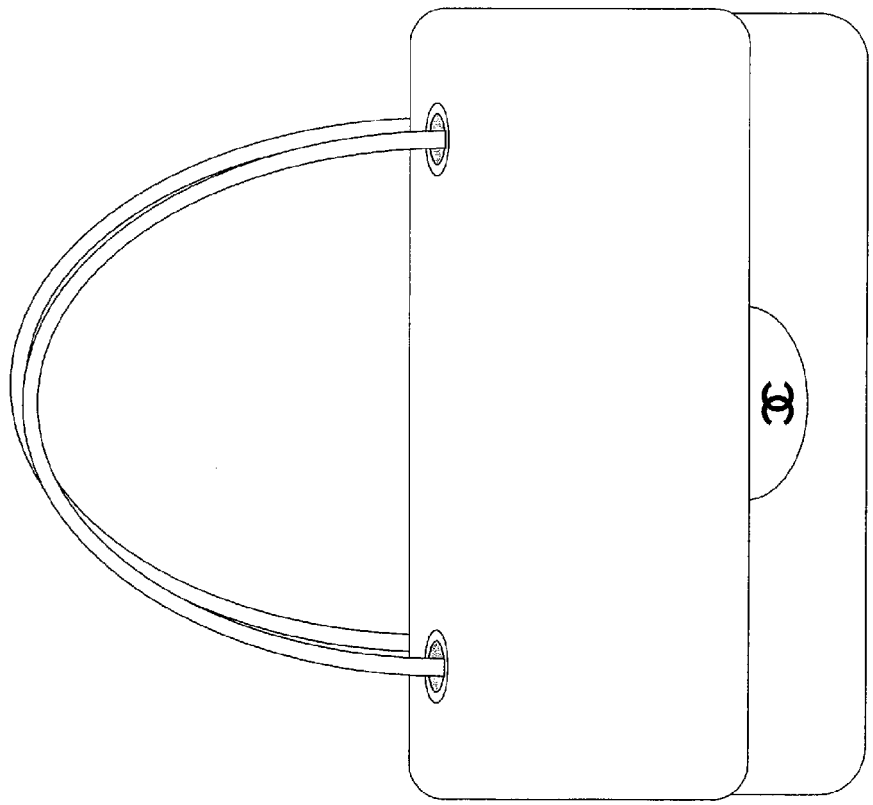
Figure 17:
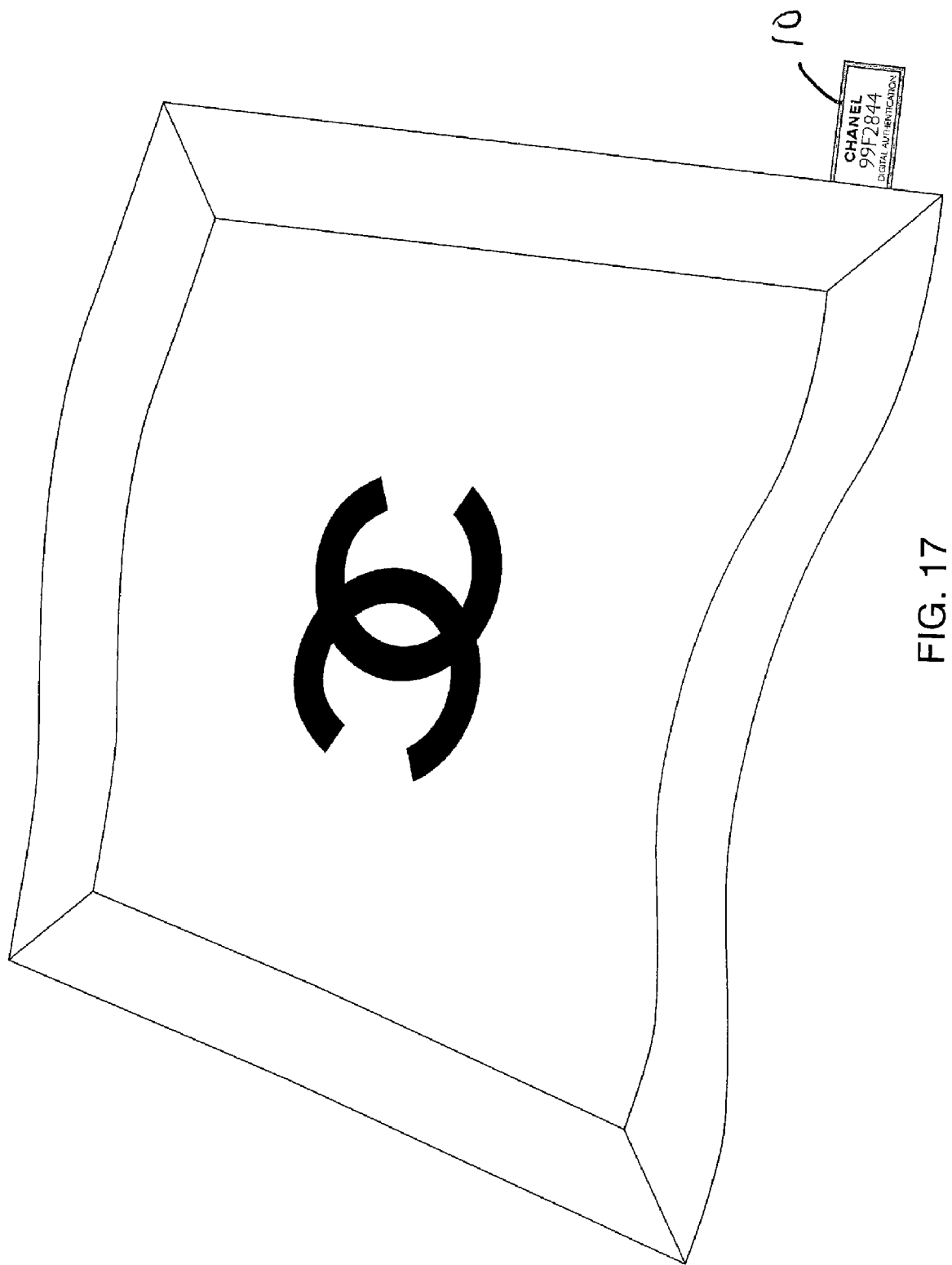
FIG. 17 illustrates a digital label 10 sewn into the hem of a scarf.
Figure 19:
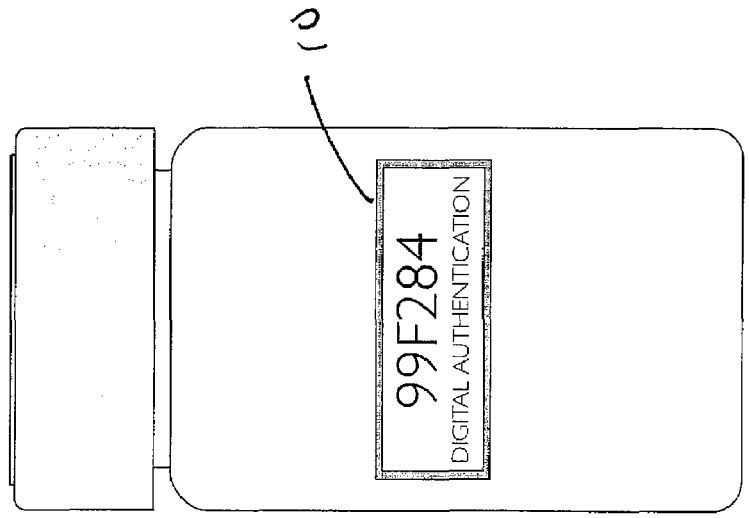
FIG. 19 illustrates a digital label applied to a product container.
Figure 18:
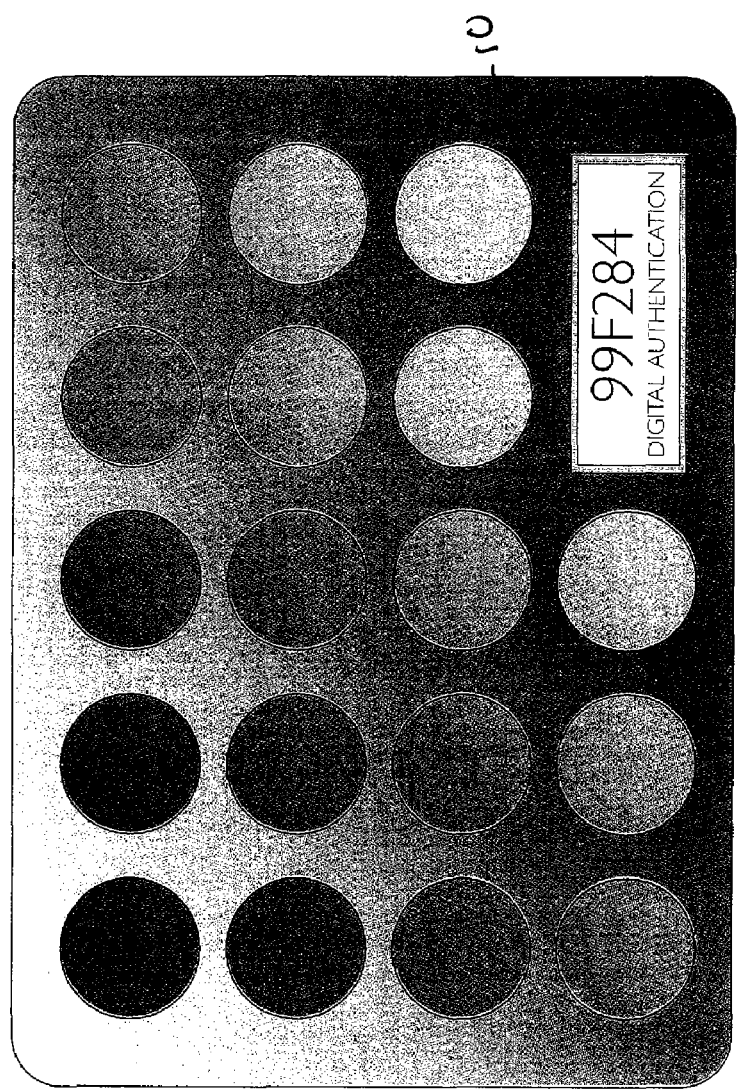
FIG. 18 illustrates a digital label applied to bubble pack for a pharmaceutical product.
Figure 20:
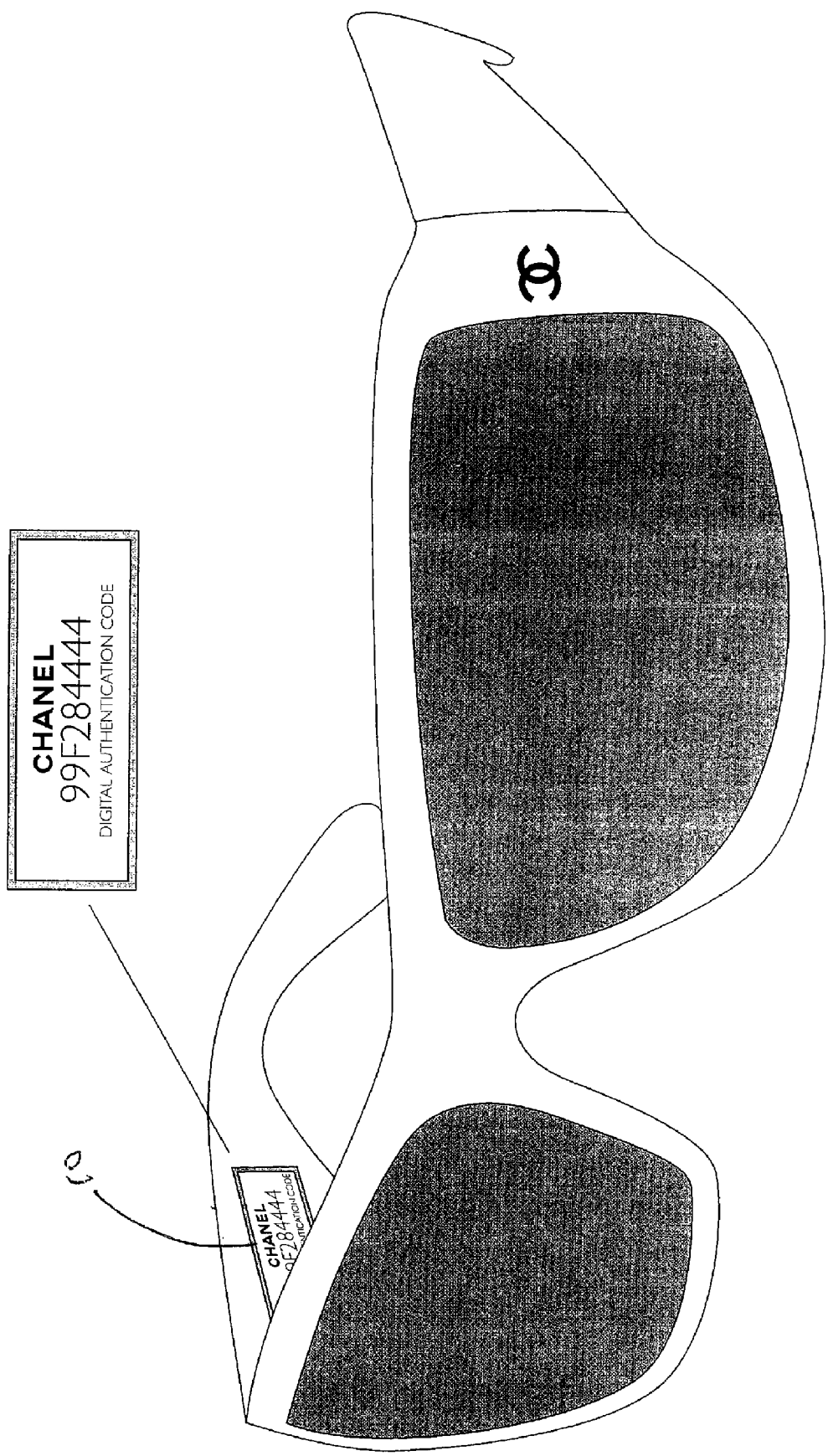
FIG. 20 shows a digital label embedded in the arm of a pair of eyeglasses.

FIGS. 12-15 illustrate various methods of attaching a digital label 10 to a product. FIG. 12 illustrates a digital labeled 10 attached to a zipper pull of a wallet by a chain. FIG. 13 illustrates a digital label 10 attached to a necklace by a chain. FIG. 14 illustrates a digital label 10 attached to a ring by a loop that passes through an opening in the digital label 10. FIG. 15 illustrates a digital label 10 applied to the face of a watch. FIG. 16 illustrates a digital label 10 sewn to the lining of a handbag. FIG. 17 illustrates a digital label 10 sewn into the hem of a scarf. FIG. 18 illustrates a digital label applied to bubble pack for a pharmaceutical product. FIG. 19 illustrates a digial label applied to a product container. FIG. 20 shows a digital label embedded in the arm of a pair of eyeglasses. Those skilled in the art will appreciate that the same attachment techniques can be used with other goods.

Figure 21:
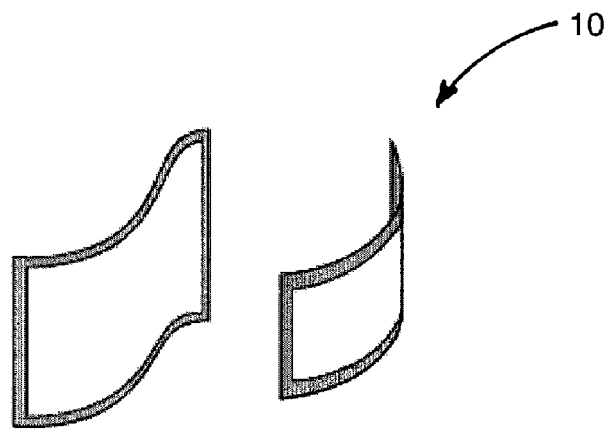
FIG. 21 illustrates a flexible digital label made with a textile display technology.
Figure 22:
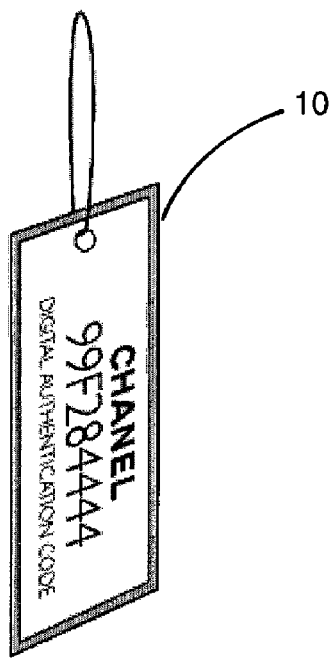
FIG. 22 illustrates a digital label in the form of a hang tag made with a textile display technology.
Figure 23:
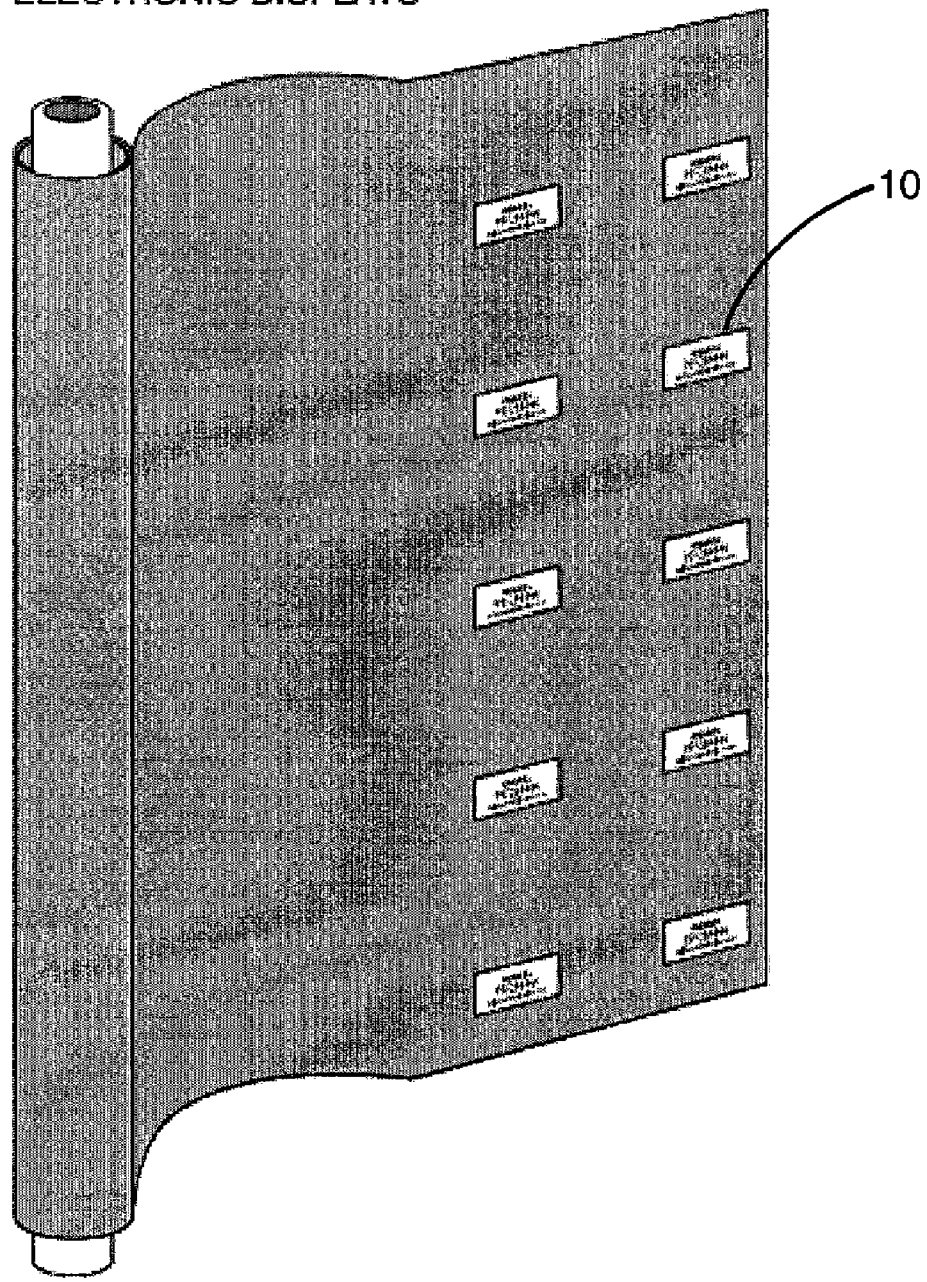
FIG. 23 illustrates a textile material with an integrated digital label made with a textile display technology.

In some embodiments, the digital label 10 may comprise a flexible or printed electronic textile display as shown in FIG. 21. Available technologies for making flexible digital labels include Philips' Lumalive fabrics LED textile display technology, Aveso/Dow's printed electronic displays, and any E-lnk manufactured flexible or textile display technology. These technologies can be used to make fabric like digital labels (FIG. 22) and embedded electronic textile labels (FIG. 23) that are fully integrated within the textile materials as shown in FIG. 22.

Several examples of the invention have been described. However, the present invention may be carried out in other specific ways than those herein set forth without departing from the spirit and essential characteristics of the invention. The present embodiments are, therefore, to be considered in all respects as illustrative and not restrictive, and all changes coming within the meaning and equivalency range of the appended claims are intended to be embraced therein.

What is claimed is:

1. A label device for being affixed to a product and conveying label information to the user of the product, said label device comprising:
   a) a digital label including a processor and a display, said processor programmed to output label information to said display; and
   b) memory in said digital label storing said label information, wherein said label information includes product authentication data for authenticating the product to which the label is attached.

2. The label device of claim 1 wherein said digital label further comprises a communications interface for communicating with a remote device.

3. The label device of claim 2 wherein the communications interface comprises a wireless interface.

4. The label device of claim 2 wherein said processor in said digital label is configured to exchange information over said communications interface with a remote device.

5. The label device of claim 4 wherein the processor is configured to transmit authentication data to a remote device.

6. The label device of claim 1 wherein said authentication data stored in memory is encrypted.

7. The label device of claim 1 further comprising a sensor to detect materials or components of a labeled product.

8. The label device of claim 7 wherein the processor is configured to authenticate the labeled product based on the detected components and materials.

9. A method for labeling a product comprising:
   a) attaching a digital label to a product, said digital label including a processing circuit, memory, and a display configured to display output label information to said display;
   b) storing product authentication data in said memory for authenticating a product to which said digital label is attached.

10. The method of claim 9 further displaying said authentication data on said display.

11. The method of claim 9 further comprising periodically changing said authentication data.

12. The method of claim 9 further comprising verifying a labeled product based on said authentication data stored in said memory.

13. The method of claim 12 wherein verifying a labeled product comprises transferring said or authentication information to an authentication server for verification.

14. The method of claim 12 wherein the authentication data is encrypted and wherein verifying a labeled product comprises decrypting the authentication data.

15. The method of claim 9 further comprising registering said labeled product.

16. A method of verifying authenticity of a product comprising:
   storing authentication data in memory of a digital product label;
   securing the product label to the product;
   verifying authenticity of a labeled product based on the authentication data stored in the product label.

17. The method of claim 16 wherein verifying authenticity of a labeled product comprises transferring said or authentication information to an authentication server for verification.

18. The method of claim 16 wherein the authentication data is encrypted and wherein verifying authenticity of a labeled product comprises decrypting the authentication data.

* * * * *